United States Patent [19]

Cochran

[11] Patent Number: 5,561,985
[45] Date of Patent: Oct. 8, 1996

[54] HEAT PUMP APPARATUS INCLUDING EARTH TAP HEAT EXCHANGER

[75] Inventor: Robert W. Cochran, Lakeland, Fla.

[73] Assignee: ECR Technologies, Inc., Lakeland, Fla.

[21] Appl. No.: 432,668

[22] Filed: May 2, 1995

[51] Int. Cl.⁶ .................................................. F25D 23/12
[52] U.S. Cl. ................................................. 62/260; 165/45
[58] Field of Search ....................... 62/260, 324.1; 165/45, 133, 172, 135

[56] References Cited

U.S. PATENT DOCUMENTS

| | | | |
|---|---|---|---|
| 2,707,095 | 4/1955 | Parsons et al. | 165/45 |
| 3,409,731 | 11/1968 | Fink et al. | 165/45 |
| 3,424,232 | 1/1969 | Garrett | 165/45 |
| 3,882,937 | 5/1975 | Robinson | 166/267 |
| 4,111,258 | 9/1978 | Jahns et al. | 165/40 |
| 4,171,721 | 10/1979 | Movick | 165/45 |
| 4,255,936 | 3/1981 | Cochran | 62/238.7 |
| 4,286,651 | 9/1981 | Steiger et al. | 165/45 |
| 4,325,228 | 4/1982 | Wolf | 62/260 |
| 4,512,156 | 4/1985 | Nagase | 60/641.2 |
| 4,573,327 | 3/1986 | Cochran | 62/238.6 |
| 4,665,716 | 5/1987 | Cochran | 62/503 |
| 4,671,351 | 6/1987 | Rappe | 165/133 |
| 4,714,108 | 12/1987 | Barry | 165/45 |
| 4,867,229 | 9/1989 | Morgensen | 165/1 |
| 5,372,016 | 12/1994 | Rawlings | 62/260 |

FOREIGN PATENT DOCUMENTS

| | | |
|---|---|---|
| 2911425 | 9/1980 | Germany . |
| 3015149A1 | 10/1981 | Germany . |
| 3022588A1 | 12/1981 | Germany . |
| 3142347A1 | 5/1983 | Germany . |
| 3203526A | 8/1983 | Germany . |
| 57-187557 | 5/1981 | Japan . |

*Primary Examiner*—Henry A. Bennett
*Assistant Examiner*—William C. Doerrler
*Attorney, Agent, or Firm*—Allen, Dyer, Doppelt, Franjola & Milbrath, P.A.

[57] ABSTRACT

A ground-coupled direct expansion heat pump apparatus includes an earth tap heat exchanger including a plurality of earth contacting tubes connected together in side-by-side relation. A first earth contacting tube defines a vapor refrigerant passageway and a second earth contacting tube provides additional heat transfer with the first earth contacting tube. Moreover, the earth tap heat exchanger includes a liquid refrigerant insulated passageway positioned within the second earth contacting tube. Each of the earth contacting tubes preferably comprises a thermal conductor, such as copper or a non-metallic material suitable for contact with refrigerant, to transfer heat with surrounding earth and with an adjacent earth contacting tube. The liquid refrigerant passageway and the vapor refrigerant passageway are preferably connected together in fluid communication adjacent lower ends thereof. Multiple vapor refrigerant passageways may be provided by additional earth contacting tubes. Method aspects of the invention are also disclosed.

47 Claims, 5 Drawing Sheets

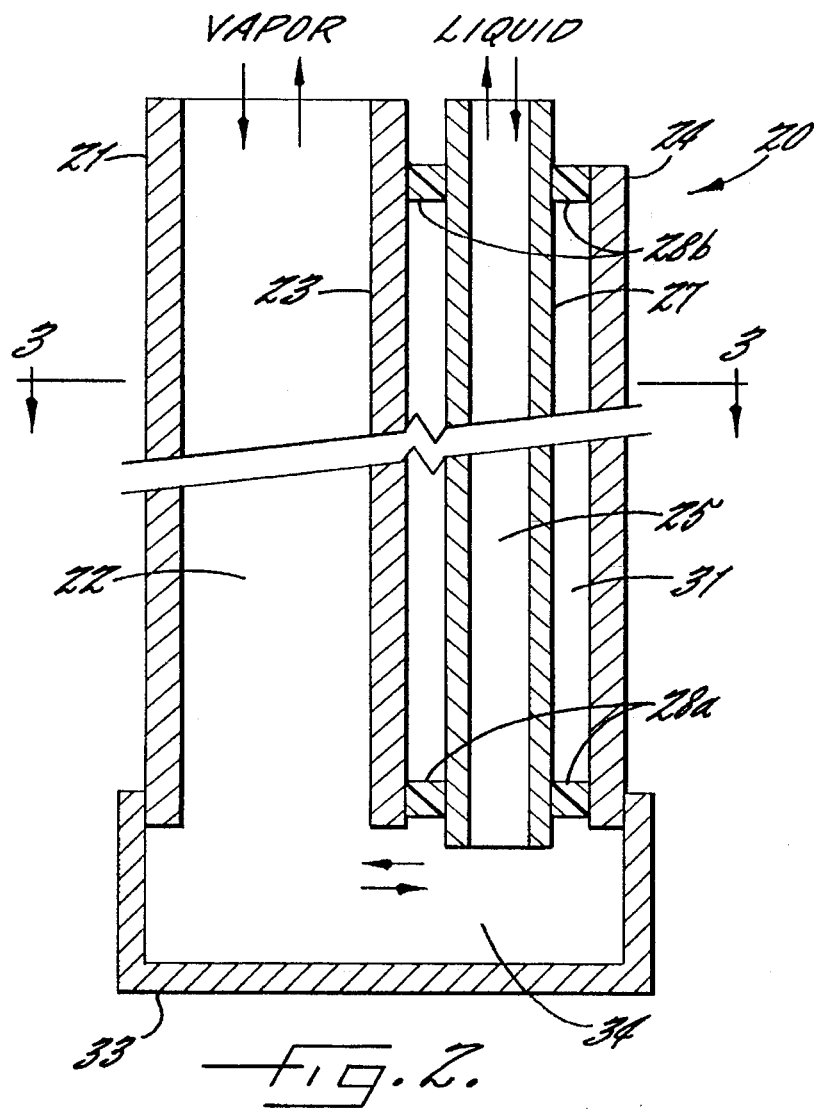
Fig. 2.
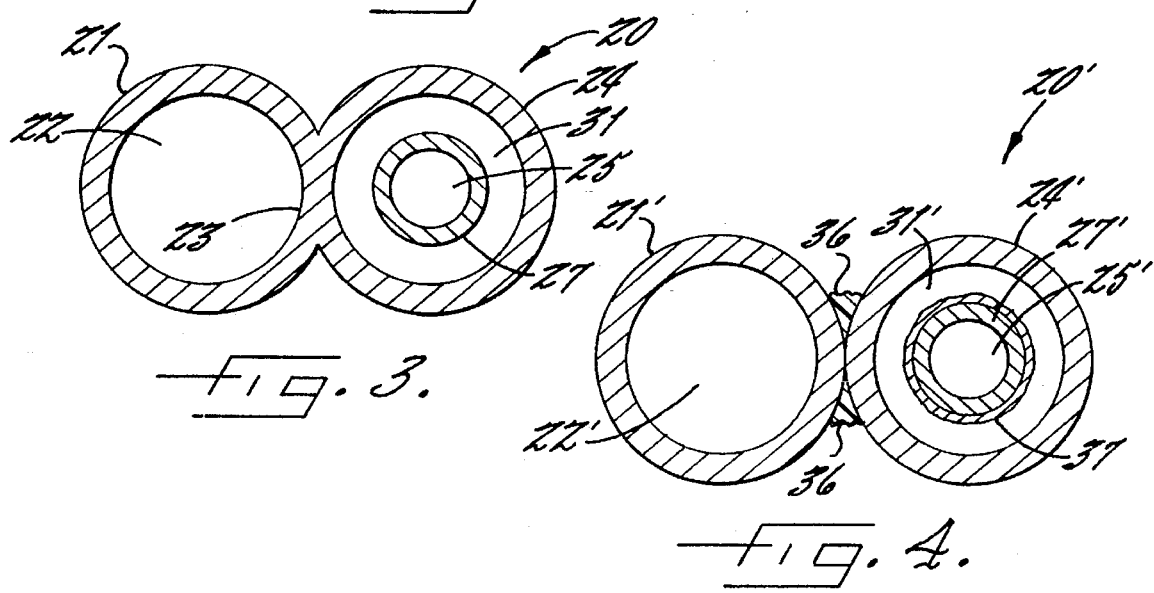
Fig. 3.
Fig. 4.

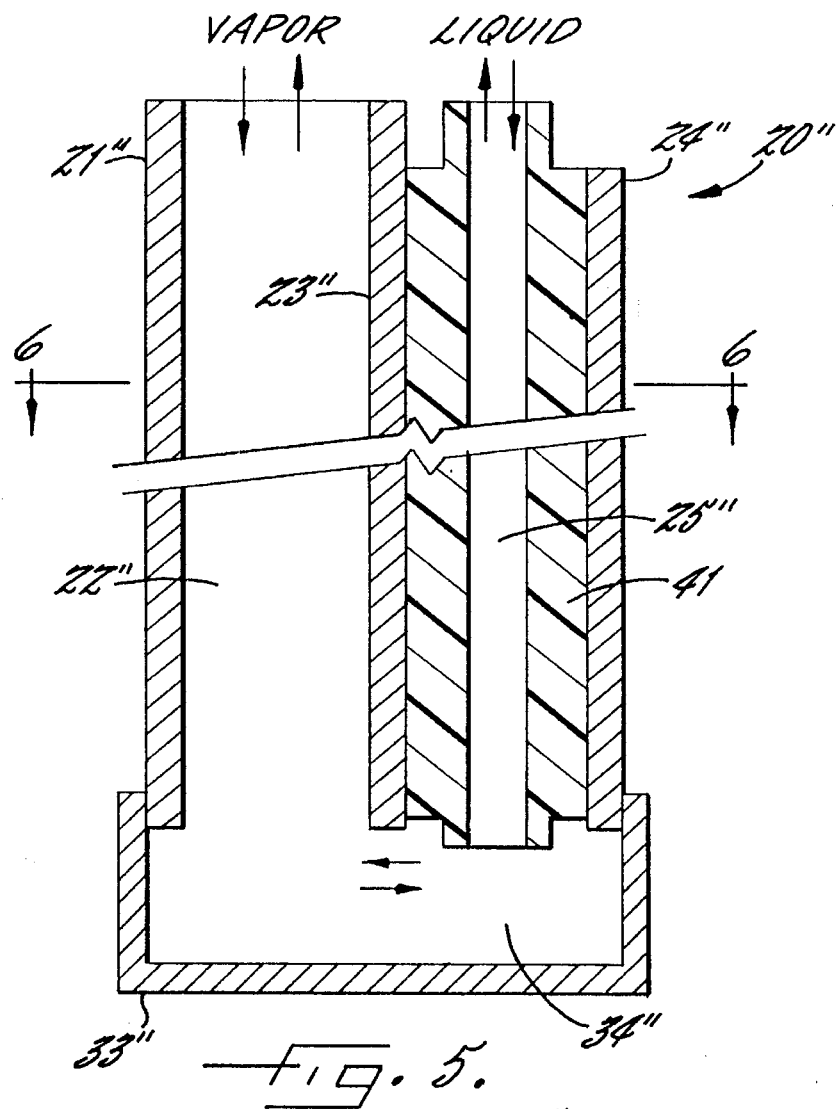
Fig. 5.
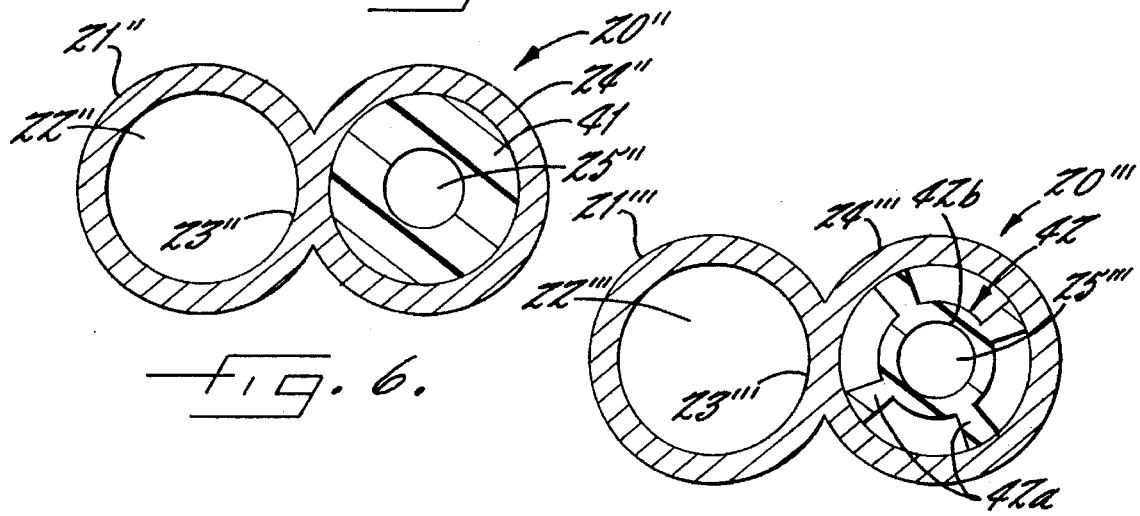
Fig. 6.
Fig. 7.

HEAT PUMP APPARATUS INCLUDING EARTH TAP HEAT EXCHANGER

FIELD OF THE INVENTION

The present invention relates to field of heating and air conditioning, and, more particularly, to a heat pump apparatus and its associated earth tap heat exchanger.

BACKGROUND OF THE INVENTION

Heat pumps have become increasing popular because of the energy efficiency in transferring rather than creating heat. A heat pump typically includes a compressor which circulates refrigerant through a first heat exchanger or condenser, through an expansion valve or opening, through a second heat exchanger or evaporator, and into a refrigerant storage device or accumulator. Vapor is withdrawn from the storage device for recirculation by the compressor. A heat pump can commonly be operated in either a heating or cooling mode by selective activation of a reversing valve.

In preferred operation, the refrigerant vapor is fully condensed to liquid at the exit of the condenser. In addition, the refrigerant is preferably fully vaporized at the exit of the evaporator as disclosed in Cochran U.S. Pat. Nos. 4,573,327 and 4,665,716, assigned to the assignee of the present invention. These patents further describe significant advances in the area of control of refrigerant flow using a charge control device in place of a conventional accumulator, and a float-type liquid control valve connected between the first and second heat exchangers to thereby enhance refrigerant flow and energy efficiency.

Air source heat pumps which exchange heat with ambient air have been most common because of their generally low initial cost. Another type of heat pump is the ground-coupled heat pump which transfers heat with the ground through a heat exchanger commonly called an earth tap. A ground-coupled heat pump is typically more efficient than an air source heat pump because the earth temperature may be more stable than ambient air.

Among the ground-coupled heat pumps are the direct expansion and closed loop type. The closed loop heat pump typically includes an intermediate fluid, such as an antifreeze solution, which is circulated between one or more buried conduits and a heat exchanger as disclosed in U.S Patent No. 4,325,228. In other words, an extra stage of heat exchange is required in the closed loop heat pump. The direct expansion heat pump circulates refrigerant directly through an earth tap heat exchanger and is more efficient than a closed loop heat pump. The term direct expansion derives from the direct expansion of the liquid refrigerant to vapor in the buried heat exchanger. In addition, the direct expansion heat pump does not require pumping of an intermediate fluid as does the closed loop heat pump. Unfortunately, a ground-coupled direct expansion heat pump may require a relatively large amount of refrigerant compared with an air-source heat pump or a closed loop heat pump.

Direct expansion heat pumps have used a U-shaped earth tap heat exchanger, including two parallel conduits joined in fluid communication at their lower ends, and wherein one conduit carries liquid and the other vapor. Unfortunately, in the cooling mode, heat may be transferred from the hot vapor conduit to the liquid conduit, particularly at the upper ends of the conduits. In other words, U-shaped tubes may be impractical for operation in the cooling mode because of thermal short circuiting between the side-by-side conduits.

Coaxial or concentric tubes for liquid and vapor refrigerant have also been used as disclosed, for example, in German Patent No. 3,203,526A. Typically a layer of insulation is provided between the concentric tubes. Unfortunately, coaxial tubes have the disadvantage that a relatively large amount of conduit material, usually copper, is required per square inch of earth contact as compared with the U-shaped tube configuration.

A significant portion of the cost of a ground-coupled heat pump may be attributed to the conventional earth tap heat exchanger. In particular, the thermally conductive material, such as copper, and the refrigerant quantity may desirably be reduced. Accordingly, greater acceptance of a ground-coupled heat pump may require advances in the area of the earth tap heat exchanger.

SUMMARY OF THE INVENTION

In view of the foregoing background, it is therefore an object of the present invention to provide a ground-coupled direct expansion heat pump apparatus and related method that efficiently operates in both the heating and cooling modes.

It is another object of the present invention to provide a ground-coupled direct expansion heat pump apparatus and related method that uses relatively less material for the earth tap heat exchanger, requires less refrigerant, and which is readily manufactured and installed.

These and other objects, features and advantages of the present invention are provided by a ground-coupled direct expansion heat pump apparatus including an earth tap heat exchanger comprising a plurality of earth contacting tubes connected together in side-by-side relation, with a first earth contacting tube defining a vapor refrigerant passageway and a second earth contacting tube providing additional heat transfer with the first earth contacting tube. Moreover, the earth tap heat exchanger includes liquid refrigerant insulated passageway defining means positioned within the second earth contacting tube for defining a liquid refrigerant passageway extending within the second earth contacting tube and being thermally insulated therefrom. The earth tap heat exchanger according to the present invention requires less material and reduces the amount of vapor space within the tap thereby reducing the refrigerant needed, as compared with a conventional coaxial or U-shaped tube earth tap heat exchanger. Accordingly, a heat pump including the earth tap heat exchanger in accordance with the invention may be more economical to produce, install, and operate.

Each of the earth contacting tubes preferably comprises a thermal conductor, such as copper or nonmetallic materials, to transfer heat with surrounding earth and with an adjacent earth contacting tube. In particular, a plastic material, such as NYLON or HYPALON, which is also suitable for direct contact with conventional refrigerants, may also be used for the earth tap heat exchanger. The liquid refrigerant passageway and the vapor refrigerant passageway are preferably connected together in fluid communication at their lower ends.

The liquid refrigerant insulated passageway defining means preferably comprises a liquid refrigerant carrying tube positioned within the second earth contacting tube and in spaced relation therefrom. A thermal insulation material may be positioned within the space defined between the liquid refrigerant carrying tube and adjacent portions of the second earth contacting tube. The thermal insulation material may be a solid or an expanded plastic material, a gas or combination of gasses, or a vacuum. To retain a vacuum or gas, the liquid refrigerant insulated passageway defining means preferably further includes sealing means positioned within opposing ends of the second earth contacting tube and cooperating with adjacent portions of the liquid refrigerant carrying tube for defining the enclosed space therewith.

A reflecting material may also be positioned between the liquid passageway and the second earth contacting tube for reflecting radiant heat away from the liquid refrigerant passageway. Yet another variation of the liquid refrigerant insulated passageway defining means may comprise a generally tubular body of thermal insulation material received within the second earth contacting tube which can directly contact the refrigerant.

Another aspect of the present invention relates to construction of the plurality of earth contacting tubes. In one embodiment the earth contacting tubes may be integrally formed, such as by extrusion, into a monolithic unit so that adjacent earth contacting tubes share a common lengthwise extending wall portion. In another embodiment, a plurality of discrete earth contacting tubes may be joined together in side-by-side relation, such as by welding, to form the connected plurality of earth contacting tubes. Thermally conductive material, such as copper, may be used to join adjacent tubes by bridging opposing portions of the adjacent copper tubes.

Each of the plurality of earth contacting tubes may have a circular transverse cross-section, but other shapes are also contemplated. In addition, the plurality of earth contacting tubes may further include one or more additional earth contacting tubes having an interior defining another vapor refrigerant passageway.

A method aspect of the invention is for making the earth tap heat exchanger according to the invention. The method preferably includes the steps of forming a plurality of earth contacting tubes connected together in side-by-side relation for positioning in earth with each of the plurality of earth contacting tubes comprising thermally conductive material to transfer heat with surrounding earth and with an adjacent earth contacting tube. A first earth contacting tube has an interior defining a vapor refrigerant passageway and a second earth contacting tube provides additional heat transfer with the first earth contacting tube. The method further comprises the steps of: defining a liquid refrigerant passageway extending within the second earth contacting tube and being thermally insulated therefrom; and connecting the liquid refrigerant passageway and the vapor refrigerant passageway together in fluid communication. In particular, the step of forming the plurality of earth contacting tubes may preferably include extruding an elongate monolithic body to have a plurality of passageways extending lengthwise therethrough and thereby defining the plurality of connected earth contacting tubes.

The plurality of connected earth contacting tubes may also be formed by joining, such as by welding, individual tubes together. The step of defining the liquid refrigerant passageway may preferably comprise positioning an insulating material within the second earth contacting tube.

BRIEF DESCRIPTION OF THE DRAWINGS

FIG. 2 is a longitudinal cross-sectional view of one embodiment of the earth tap heat exchanger according to the invention.

FIG. 3 is a transverse cross-sectional view taken along lines 3—3 of FIG. 2.

FIG. 4 is a transverse cross-sectional view of another embodiment of an earth tap heat exchanger according to the invention.

FIG. 5 is a longitudinal cross-sectional view of yet another embodiment of an earth tap heat exchanger according to the invention.

FIG. 6 is a transverse cross-sectional view taken along lines 6—6 of FIG. 5.

FIG. 7 is a transverse cross-sectional view of still another embodiment of an earth tap heat exchanger according to the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout, and prime and multiple prime notation is used to indicate similar elements in various embodiments.

Figure 1:
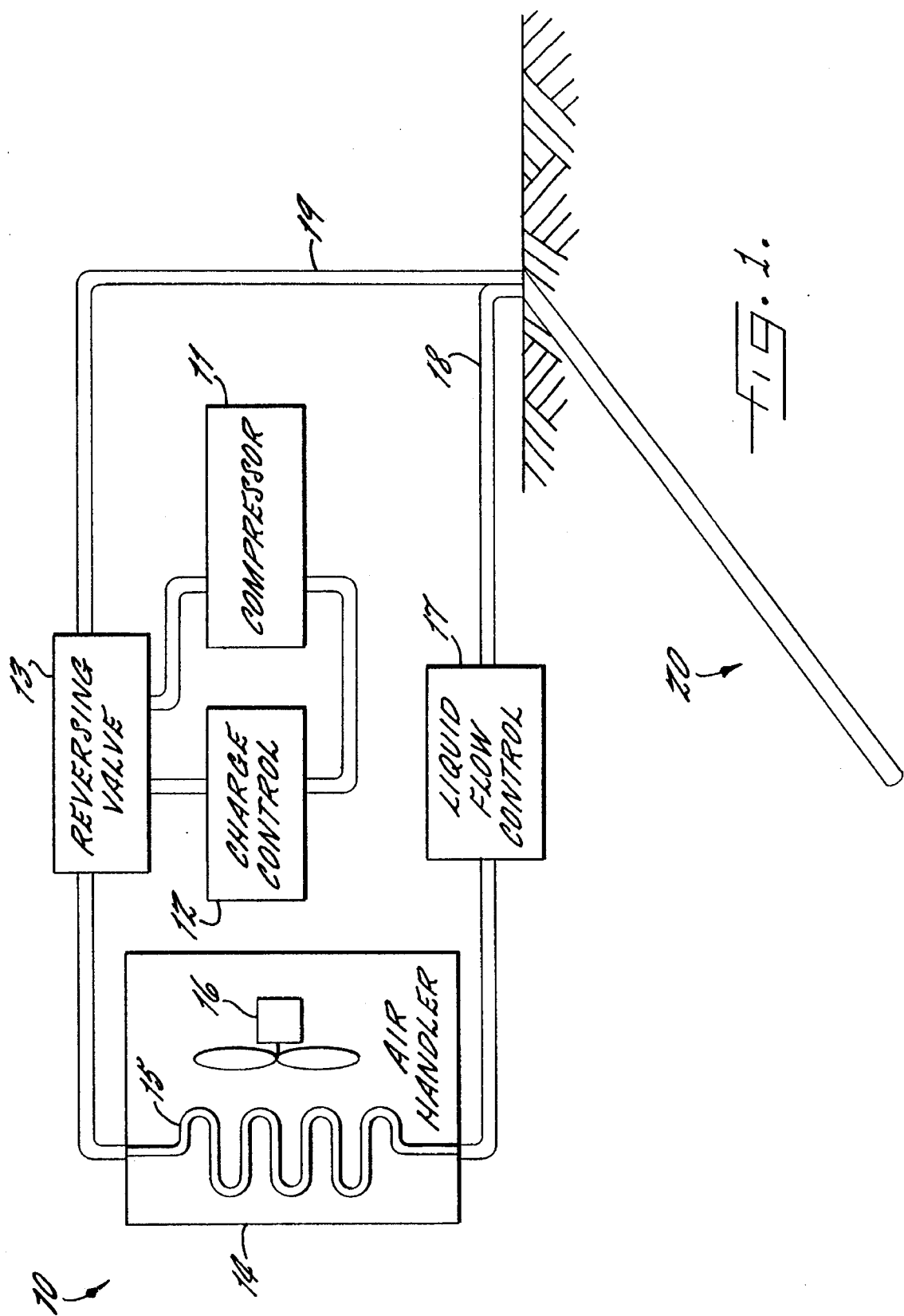
FIG. 1 is a schematic diagram illustrating the heat pump apparatus and including the earth tap heat exchanger in accordance with the invention.

Referring first to FIGS. 1–3, a first embodiment of the heat pump apparatus 10 and including the earth tap heat exchanger 20 according to the invention is described. The heat pump apparatus includes an air handler 14 including a blower 16 and a first heat exchanger 15 as would be readily understood by those skilled in the art. In addition, the illustrated heat pump apparatus 10 includes a compressor 11, refrigerant charge control device 12, and liquid flow control device 17 as described in U.S. Pat. Nos. 4,665,716 and 4,573,327, assigned to the assignee of the present invention, and the entire disclosures of which are incorporated herein by reference. The charge control device 12 may preferably be capable of maintaining a desired quantity of refrigerant in active circulation within the heat pump apparatus. In addition, the liquid flow control device 17 may preferably be a float-type liquid flow control valve. A conventional accumulator may also be used as a charge control device 12, and other conventional valves or liquid metering means may be used as the liquid flow control device 17.

As would also be readily understood by those skilled in the art, the compressor 11 circulates refrigerant through the first heat exchanger 15 and the earth tap heat exchanger 20. In addition, the heat pump apparatus 10 includes a conventional reversing valve 13 for permitting selective operation of the apparatus in either a heating or cooling mode, as described in greater detail below.

The earth tap heat exchanger 20 is connected in fluid communication with a liquid line 18 and a vapor line 19 in the illustrated embodiment. A single earth tap heat exchanger 20 is shown in the illustrated embodiment, however, multiple earth tap heat exchangers may extend into the earth and be connected in fluid communication at a manifold, as would be readily understood by those skilled in the art.

The earth tap heat exchanger 20 includes a plurality of earth contacting tubes connected together for positioning in earth. Each of the plurality of earth contacting tubes preferably comprises thermally conductive material, such as copper, to transfer heat with surrounding earth and with an adjacent earth contacting tube. Alternately, a thermally conductive non-metallic material may be used for the earth contacting tubes. For example, NYLON or HYPALON may be used since both are also suitable for direct contact with conventional refrigerants.

As shown in the illustrated embodiment of FIGS. 2 and 3, a first earth contacting tube 21 has an interior defining a vapor refrigerant passageway 22. A second earth contacting tube 24 is connected in side-by-side relation to the first earth contacting tube 21 and provides additional heat transfer with the first earth contacting tube, so that heat can be additionally transferred between refrigerant vapor passing within the vapor refrigerant passageway 22 and the earth surrounding the second earth contacting tube.

Liquid refrigerant insulated passageway defining means is positioned within the second earth contacting tube 24 for defining a liquid refrigerant passageway 25 extending within the second earth contacting tube and being thermally insulated therefrom. The liquid refrigerant passageway 25 and the vapor refrigerant passageway 22 are connected together in fluid communication.

In the illustrated embodiment of the earth tap heat exchanger 20 as shown in FIGS. 2 and 3, the liquid refrigerant insulated passageway defining means comprises a liquid refrigerant carrying tube 27 positioned within the second earth contacting tube 24 and in spaced relation therefrom. More particularly, annular sealing rings 28*a*, 28*b* may be provided within upper and lower ends of the second earth contacting tube and cooperate with adjacent portions of the liquid refrigerant carrying tube to define an enclosed space 31. Accordingly, a vacuum, gas, or gas mixture may be retained within the enclosed space 31 to provide thermal insulation for the liquid refrigerant passageway 25. In addition, a solid layer of insulating material may surround the liquid carrying tube 27 in place of the vacuum or gas, in which case the sealing rings may not be required. The insulation material may be an expanded polymer insulation or other insulating material as would be readily understood by those skilled in the art.

As shown in FIGS. 2 and 3, the first and second earth contacting tubes may be connected in fluid communication by the end cap 33 as schematically illustrated. Accordingly, a passageway or opening 34 connects the vapor refrigerant passageway 22 and the liquid refrigerant passageway 25 in fluid communication. Other configurations for connecting the vapor refrigerant passageway 22 and liquid refrigerant passageway 25 in fluid communication are also contemplated by the invention and will be readily appreciated by those skilled in the art.

The plurality of earth contacting tubes 21, 24 are preferably integrally formed into a monolithic unit so that adjacent earth contacting tubes share a common lengthwise extending wall portion 23 as shown in FIGS. 2 and 3. The earth contacting tubes 21, 24 may be extruded or otherwise joined together during manufacturing as would be readily understood by those skilled in the art. The monolithic embodiment may be readily formed and thereby avoid additional labor as may be necessary to align and join discrete tubes as described below.

When the heat pump apparatus 10 is operating in the heating mode, liquid refrigerant is delivered to the upper end of the liquid carrying tube 27 and proceeds downward therethrough, and enters the lower end portion of the vapor refrigerant passageway The liquid refrigerant evaporates within the vapor refrigerant passageway 22, thereby extracting heat from the earth surrounding both the first and second earth contacting tubes 21, 24. In other words, earth contact relative to the amount of material used to construct the earth tap 20 is increased so that, for example, a reduced amount of material may be used thereby reducing the initial cost.

When the heat pump apparatus 10 is used for cooling, hot refrigerant vapor is delivered to the upper end of the vapor refrigerant passageway 22, flows downward therethrough and condenses to liquid, which, in turn, is withdrawn from the liquid carrying tube 27. The hot vapor transfers heat to the earth surrounding both the first and second earth contacting tubes 21, 24.

It can be seen that the earth tap 20 according to the present invention has the advantage over a conventional U-shaped tube earth tap in that a pair of earth contacting tubes 21, 24 provides thermal contact between the refrigerant vapor and the earth. In particular, the earth tap 20 according to the invention may operate efficiently in the cooling mode, as the insulating medium provides thermal insulation between the refrigerant liquid and the hot second earth contacting tube 24. In other terms, the present invention avoids thermal short circuiting as may occur in a conventional U-shaped tube earth tap heat exchanger.

Further, the earth tap exchanger 20 has advantages over a conventional coaxial earth tap in that less material, such as copper, is required for a given amount of system capacity. For example, for a same amount of earth contact and heat transfer capacity, the earth tap heat exchanger 20 according to the invention, may use standard refrigeration sizes of $\frac{3}{8}$ in. OD, $\frac{3}{8}$ in. OD, and $\frac{3}{16}$ in. OD tubes, in place of a coaxial earth tap tube sizes of $\frac{5}{8}$ in. OD, $\frac{3}{8}$ in. OD, and $\frac{3}{16}$ in. OD resulting in a substantial 29% reduction in the earth tap material required. Another advantage is that the vapor space in the vapor refrigerant passageway 22 is reduced 42% relative to the coaxial tap, which thereby reduces the total system refrigerant charge required. Therefore, it can be seen that the present invention may enjoy reduced initial and operating costs, as well as operate more efficiently. Additional advantages include a reduced possibility of trapping compressor oil within the earth tap heat exchanger 20 and improved start up characteristics for the cooling mode.

Another variation of the earth tap heat exchanger 21' is explained with reference additionally to FIG. 4. In this illustrated embodiment, the earth tap heat exchanger 21' is formed by joining the pair of discrete earth contacting tubes 21', 24' such as by welding, use of an adhesive, or by using a thermally conductive filler between the tubes. Preferably the joining or filler material 36 is thermally conductive and is compatible with the material of the tubes to reduce a likelihood of corrosion. For example, both the tube material and the filler or joining material may be copper. The weld material 36 bridges the opposing portions of the earth contacting tubes 21', 24'.

The embodiment of FIG. 4 also includes a reflective layer 37 surrounding the liquid carrying tube 27'. For example, a white paint or other coating may be applied to the exterior of the liquid refrigerant carrying tube 27'. Alternative embodiments may include a reflective surface finish of the liquid refrigerant carrying tube, or the tube itself may be formed of a reflective material. The other elements of the embodiment of FIG. 4 are similar to those described above, and need no further explanation.

Each of the earth contacting tubes 21, 24 has a same circular transverse cross-section in the embodiments illustrated in FIGS. 2–4. However, other cross-sectional shapes may also be used including rectangular or square cross-sections. The circular cross-sectional shape may provide a greater crush resistance for a given wall thickness than other configurations. In addition, the first and second earth contacting tubes 21, 24 may also have different diameters in addition to the same diameters as illustrated.

Referring now to FIGS. 5 and 6 another embodiment of the earth tap heat exchanger 20" is described. In this embodiment, the liquid refrigerant insulated passageway defining means comprises a generally tubular body 41 of thermal insulation material received within the second earth contacting tube 24". The tubular body 41 may be formed of a suitable plastic material, such as expanded NYLON or HYPALON, which provides thermal insulating capability, and which may include a sealed or solid surface portion suitable for direct contact with conventional fluorocarbon refrigerants. Other materials having closed cell structures may also be used as would be readily understood by those having skill in the art.

Another variation of the tubular body 42 is illustrated in FIG. 7, wherein a series of spokes 42a extend outwardly from a central tube portion 42b. Other lattice type structures are also contemplated by the invention. The other elements of FIGS. 5–6 and 7 are indicated by multiple prime notation and are similar to those described above with reference to FIGS. 2–4, and need no further description herein.

Figure 8:
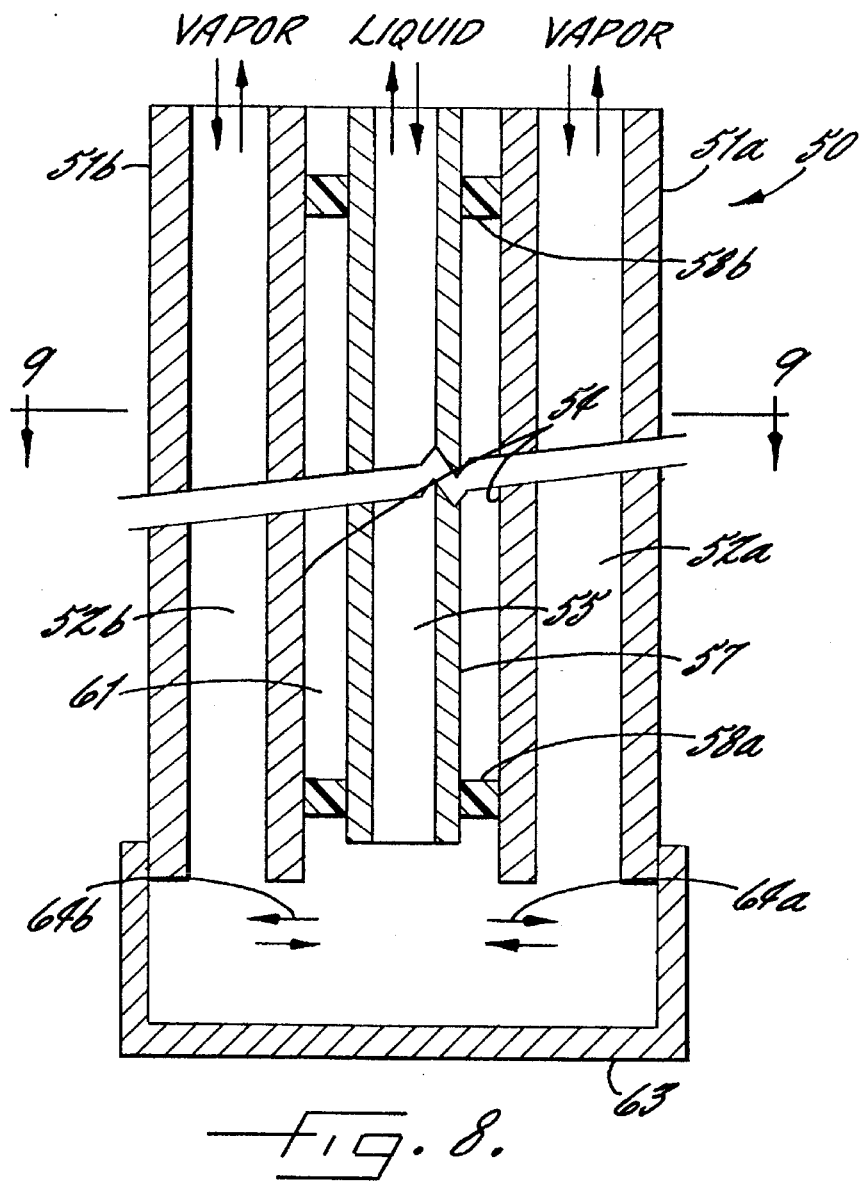
FIG. 8 is a longitudinal cross-sectional view of a further embodiment of an earth tap heat exchanger according to the invention.
Figure 9:
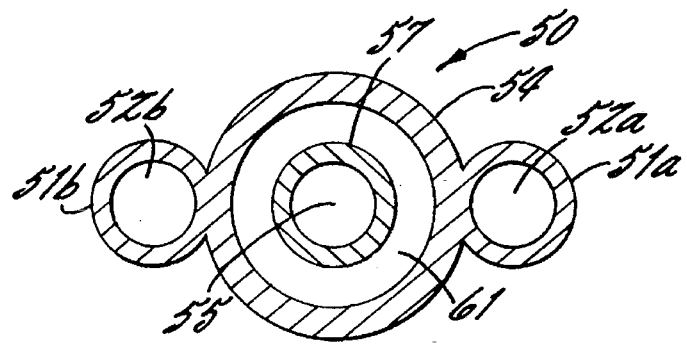
FIG. 9 is a transverse cross-sectional view taken along lines 9—9 of FIG. 8.

Referring now additionally to FIGS. 8 and 9, yet another embodiment of the earth tap heat exchanger 50 is described. The illustrated embodiment includes a central earth contacting tube 54, and a pair of outer earth contacting tubes 51a, 51b connected on opposing sides of the central earth contacting tube. The outer earth contacting tubes 51a, 51b have respective interiors that define vapor refrigerant passageways, 52a, 52b, respectively. The outer earth contacting tubes 51a, 51b are connected in fluid communication with the liquid refrigerant passageway 55 via openings 64a, 64b.

Lower and upper sealing rings 52a, 52b surround the liquid refrigerant carrying tube 57 to define an enclosed space which may retain a vacuum, or include an insulating gas, or other insulating material. As would be readily understood by those skilled in the art, other means for defining a vapor refrigerant insulated passageway as described above, may also be used in this embodiment.

The double vapor passageways 52a, 52b further reduce the needed system refrigerant charge and will also further facilitate start-up of the heat pump apparatus 10 in the cooling mode. Along these lines, additional earth contacting tubes may be provided for carrying the vapor refrigerant limited perhaps by an increased pressure drop that may occur. The additional earth contacting tubes may be connected to define a ribbon-like structure, or may be positioned around the periphery of a central tube having a circular or other cross-sectional shape.

Figure 10:
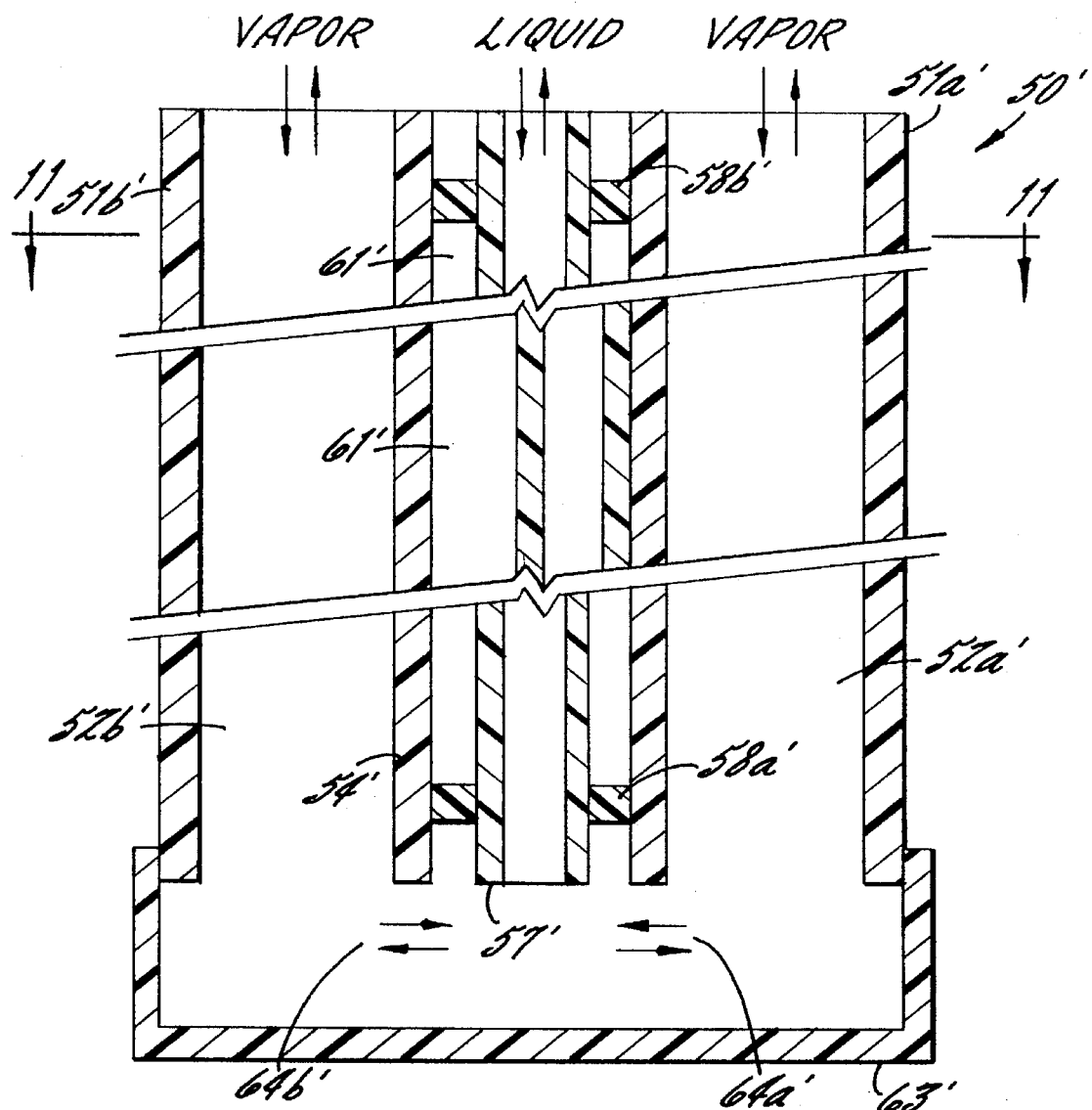
FIG. 10 is a longitudinal cross-sectional view of yet a further embodiment of an earth tap heat exchanger according to the invention.
Figure 11:
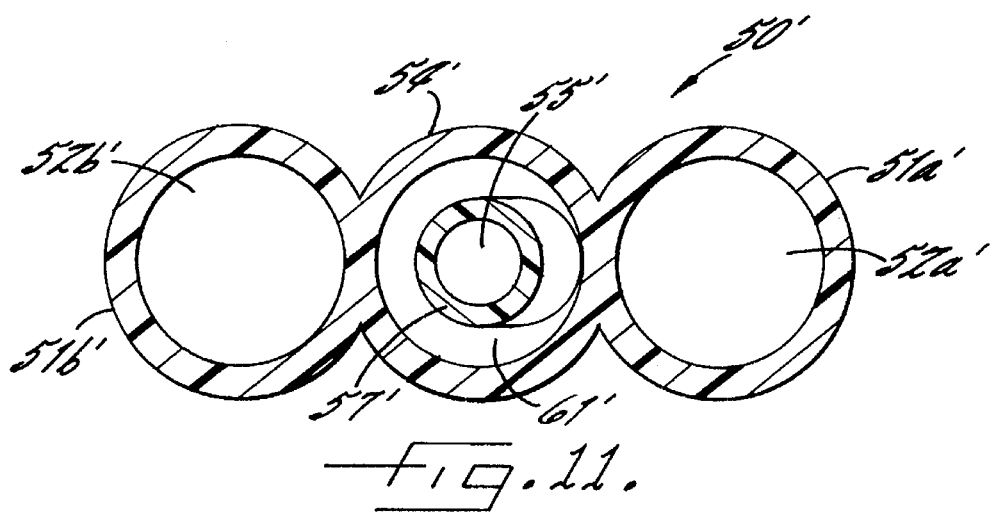
FIG. 11 is a transverse cross-sectional view taken along lines 11—11 of FIG. 10.

Another embodiment of the earth tap heat exchanger according to the invention is explained with further reference to FIGS. 10 and 11. The illustrated embodiment, includes three earth contacting tubes 51a', 54' and 51b' connected together in side-by-side relation. Each of the tubes may preferably be formed of a non-metallic or plastic material, such as NYLON or HYPALON, which provides sufficient thermal conductivity, yet which also suitable for direct contact with the refrigerant. The liquid refrigerant carrying tube 57' may also be formed of HYPALON or NYLON and may be insulated by a vacuum space or gas. As would be readily understood by those skilled in the art, due to the length of the earth tap 50', the liquid refrigerant carrying tube 57' may intermittently touch adjacent portions of the inside wall of the central earth contacting tube 54'. However, the spacing 6L' is still sufficient to provide the desired degree of thermal insulation. The other elements of the illustrated embodiment are similar to those having similar numerals and described above with reference to FIGS. 8 and 9.

A method aspect of the present invention is for making an earth tap heat exchanger 20 for use with a ground-coupled heat pump apparatus 10 as described above. The method preferably comprises forming a plurality of earth contacting tubes 21, 24 connected together for positioning in earth. Each of the plurality of earth contacting tubes preferably comprises thermally conductive material to transfer heat with surrounding earth and with an adjacent earth contacting tube. A first earth contacting tube 21 has an interior defining a vapor refrigerant passageway 22, and a second earth contacting tube 24 for providing additional heat transfer with the first earth contacting tube. The method further comprises defining a liquid refrigerant passageway 25 extending within the second earth contacting tube 24 and being thermally insulated therefrom; and connecting the liquid refrigerant passageway 25 and the vapor refrigerant passageway 22 together in fluid communication. In addition, the step of defining the liquid refrigerant passageway preferably comprises positioning an insulating material within the second earth contacting tube 24.

The step of forming the plurality of earth contacting tubes connected together preferably comprises extruding an elongate monolithic body to have a plurality of passageways extending lengthwise therethrough and thereby defining the plurality of connected earth contacting tubes 21, 24. Alternately, the step of forming the plurality of earth contacting tubes connected together may comprise providing a plurality of discrete tubes 21', 24' and joining the tubes together in side-by-side relation, such as by welding.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A ground-coupled direct expansion heat pump apparatus comprising:

a first heat exchanger, an earth tap heat exchanger, and compressor means for circulating refrigerant through said first heat exchanger and said earth tap heat exchanger, said earth tap heat exchanger comprising a plurality of earth contacting tubes connected together in side-by-side relation for positioning in earth, each of said plurality of earth contacting tubes comprising thermally conductive material to transfer heat with surrounding earth and with an adjacent earth contacting tube, a first earth contacting tube having an interior defining a vapor refrigerant passageway, a second earth contacting tube providing additional heat transfer with the first earth contacting tube, and liquid refrigerant insulated passageway defining means positioned within the second earth contacting tube for defining a liquid refrigerant passageway extending within the second earth contacting tube and being thermally insulated therefrom, the liquid refrigerant passageway and the vapor refrigerant passageway being connected together in fluid communication.

2. A heat pump apparatus according to claim 1 wherein said liquid refrigerant insulated passageway defining means comprises a liquid refrigerant carrying tube positioned within the second earth contacting tube and in spaced relation therefrom.

3. A heat pump apparatus according to claim 2 wherein said liquid refrigerant insulated passageway defining means further comprises a thermal insulation material positioned within a space defined between the liquid refrigerant carrying tube and adjacent portions of the second earth contacting tube.

4. A heat pump apparatus according to claim 2 wherein said liquid refrigerant insulated passageway defining means further comprises sealing means positioned within opposing ends of the second earth contacting tube and cooperating with adjacent portions of said liquid refrigerant carrying tube for defining an enclosed space retaining a vacuum therein.

5. A heat pump apparatus according to claim 2 wherein said liquid refrigerant insulated passageway defining means further comprises:

sealing means positioned within opposing ends of the second earth contacting tube and cooperating with adjacent portions of said liquid refrigerant carrying tube for defining an enclosed space; and a thermally insulating gas filling the enclosed space.

6. A heat pump apparatus according to claim 1 wherein said liquid refrigerant insulated passageway defining means comprises a generally tubular body of thermal insulation material received within the second earth contacting tube.

7. A heat pump apparatus according to claim 1 wherein said liquid refrigerant insulated passageway defining means further comprises a reflecting material between the liquid passageway and said second earth contacting tube for reflecting radiant heat away from the liquid passageway.

8. A heat pump apparatus according to claim 1 wherein said plurality of earth contacting tubes are integrally formed into a monolithic unit so that adjacent earth contacting tubes share a common lengthwise extending wall portion.

9. A heat pump apparatus according to claim 1 wherein each of said plurality of earth contacting tubes comprises copper.

10. A heat pump apparatus according to claim 1 wherein each of said plurality of earth contacting tubes comprises a non-metallic material suitable for contact with refrigerant.

11. A heat pump apparatus according to claim 1 wherein said earth tap heat exchanger further comprises thermally conductive material bridging opposing portions of adjacent earth contacting tubes.

12. A heat pump apparatus according to claim 1 wherein each of said plurality of earth contacting tubes has a circular transverse cross-section.

13. A heat pump apparatus according to claim 12 wherein said plurality of earth contacting tubes have substantially equal diameters.

14. A heat pump apparatus according to claim 1 wherein said plurality of earth contacting tubes further comprises a third earth contacting tube connected to the second earth contacting tube and having an interior defining a second vapor refrigerant passageway.

15. An earth tap heat exchanger for use in a ground-coupled direct expansion heat pump apparatus, said earth tap heat exchanger comprising:

a plurality of earth contacting tubes connected together in side-by-side relation for positioning in earth, each of said plurality of earth contacting tubes comprising thermally conductive material to transfer heat with surrounding earth and with an adjacent earth contacting tube, a first earth contacting tube having an interior defining a vapor refrigerant passageway, a second earth contacting tube providing additional heat transfer with the first earth contacting tube; and liquid refrigerant insulated passageway defining means positioned within the second earth contacting tube for defining a liquid refrigerant passageway extending within the second earth contacting tube and being thermally insulated therefrom, the liquid refrigerant passageway and the vapor refrigerant passageway being connected together in fluid communication.

16. An earth tap heat exchanger according to claim 15 wherein said liquid refrigerant insulated passageway defining means comprises a liquid refrigerant carrying tube positioned within the second earth contacting tube and in spaced relation therefrom.

17. An earth tap heat exchanger according to claim 16 wherein said liquid refrigerant insulated passageway defining means further comprises a thermal insulation material positioned within a space defined between the liquid refrigerant carrying tube and adjacent portions of the second earth contacting tube.

18. An earth tap heat exchanger according to claim 16 wherein said liquid refrigerant insulated passageway defining means further comprises sealing means positioned within opposing ends of the second earth contacting tube and cooperating with adjacent portions of said liquid refrigerant carrying tube for defining an enclosed space retaining a vacuum therein.

19. An earth tap heat exchanger according to claim 16 wherein said liquid refrigerant insulated passageway defining means further comprises:

sealing means positioned within opposing ends of the second earth contacting tube and cooperating with adjacent portions of said liquid refrigerant carrying tube for defining an enclosed space; and a thermally insulating gas filling the enclosed space.

20. An earth tap heat exchanger according to claim 15 wherein said liquid refrigerant insulated passageway defining means comprises a generally tubular body of insulating material received within the second earth contacting tube.

21. An earth tap heat exchanger according to claim 15 wherein said liquid refrigerant insulated passageway defining means further comprises a reflecting material between said liquid passageway and said second earth contacting tube for reflecting radiant heat away from said liquid passageway.

22. An earth tap heat exchanger according to claim 15 wherein said plurality of earth contacting tubes are integrally formed into a monolithic unit so that adjacent earth contacting tubes share a common lengthwise extending wall portion.

23. An earth tap heat exchanger according to claim 15 wherein each of said plurality of earth contacting tubes comprises copper.

24. An earth tap heat exchanger according to claim 15 wherein each of said plurality of earth contacting tubes comprises a non-metallic material suitable for contact with refrigerant.

25. An earth tap heat exchanger according to claim 15 wherein said earth tap heat exchanger further comprises thermally conductive material bridging opposing portions of adjacent earth contacting tubes.

26. An earth tap heat exchanger according to claim 15 wherein each of said plurality of earth contacting tubes has a circular transverse cross-section.

27. An earth tap heat exchanger according to claim 26 wherein said plurality of earth contacting tubes have substantially equal diameters.

28. An earth tap heat exchanger according to claim 15 wherein said plurality of earth contacting tubes further comprises a third earth contacting tube connected to the second earth contacting tube and having an interior defining a second vapor refrigerant passageway.

29. An earth tap heat exchanger for use in a ground-coupled heat pump apparatus, said earth tap heat exchanger comprising:

an elongate monolithic body having a plurality of passageways extending lengthwise therethrough and defining a plurality of earth contacting tubes, said elongate monolithic body comprising thermally conductive material to transfer heat with surrounding earth, a first earth contacting tube having an interior defining a vapor refrigerant passageway, a second earth contacting tube providing additional heat transfer with the first earth contacting tube; and liquid refrigerant insulated passageway defining means positioned within the second earth contacting tube for defining a liquid refrigerant passageway extending within the second earth contacting tube and being thermally insulated therefrom, the liquid refrigerant passageway and the vapor refrigerant passageway being connected together in fluid communication.

30. An earth tap heat exchanger according to claim 29 wherein said liquid refrigerant insulated passageway defining means comprises a liquid refrigerant carrying tube positioned within the second earth contacting tube and in spaced relation therefrom.

31. An earth tap heat exchanger according to claim 30 wherein said liquid refrigerant insulated passageway defining means further comprises a thermal insulation material positioned within a space defined between the liquid refrigerant carrying tube and adjacent portions of the second earth contacting tube.

32. An earth tap heat exchanger according to claim 30 wherein said liquid refrigerant insulated passageway defining means further comprises sealing means positioned within opposing ends of the second earth contacting tube and cooperating with adjacent portions of said liquid refrigerant carrying tube for defining an enclosed space retaining a vacuum therein.

33. An earth tap heat exchanger according to claim 30 wherein said liquid refrigerant insulated passageway defining means further comprises:

sealing means positioned within opposing ends of the second earth contacting tube and cooperating with adjacent portions of said liquid refrigerant carrying tube for defining an enclosed space; and a thermally insulating gas filling the enclosed space.

34. An earth tap heat exchanger according to claim 29 wherein said liquid refrigerant insulated passageway defining means comprises a generally tubular body of insulating material received within the second earth contacting tube.

35. An earth tap heat exchanger according to claim 29 wherein said liquid refrigerant insulated passageway defining means further comprises a reflecting material between said liquid passageway and said second earth contacting tube for reflecting radiant heat away from said liquid passageway.

36. An earth tap heat exchanger according to claim 29 wherein each of said plurality of earth contacting tubes comprises copper.

37. An earth tap heat exchanger according to claim 29 wherein each of said plurality of earth contacting tubes comprises a non-metallic material suitable for contact with refrigerant.

38. An earth tap heat exchanger according to claim 29 wherein each of said plurality of earth contacting tubes has a circular transverse cross-section.

39. An earth tap heat exchanger for use in a ground-coupled heat pump apparatus, said earth tap heat exchanger comprising:

an elongate monolithic body having a plurality of passageways extending lengthwise therethrough and defining a plurality of earth contacting tubes, said elongate monolithic body comprising a non-metallic thermally conductive material to transfer heat with surrounding earth and suitable for contact with refrigerant, a first earth contacting tube having an interior defining a vapor refrigerant passageway, a second earth contacting tube providing additional heat transfer with the first earth contacting tube; and a liquid refrigerant carrying tube positioned within the second earth contacting tube and in spaced relation therefrom for defining a liquid refrigerant passageway extending within the second earth contacting tube and being thermally insulated therefrom, the liquid refrigerant passageway and the vapor refrigerant passageway being connected together in fluid communication.

40. An earth tap heat exchanger according to claim 39 further comprising sealing means positioned within opposing ends of the second earth contacting tube and cooperating with adjacent portions of said liquid refrigerant carrying tube for defining an enclosed space retaining a vacuum therein.

41. An earth tap heat exchanger according to claim 39 further comprising sealing means positioned within opposing ends of the second earth contacting tube and cooperating with adjacent portions of said liquid refrigerant carrying tube for defining an enclosed space; and a thermally insulating gas filling the enclosed space.

42. An earth tap heat exchanger according to claim 39 further comprising a reflecting material between said liquid passageway and said second earth contacting tube for reflecting radiant heat away from said liquid passageway.

43. An earth tap heat exchanger according to claim 39 wherein said plurality of earth contacting tubes further comprises a third earth contacting tube connected to the second earth contacting tube and having an interior defining a second vapor refrigerant passageway.

44. A method for making an earth tap heat exchanger for use with a ground-coupled heat pump apparatus, the method comprising the steps of:

forming a plurality of earth contacting tubes connected together for positioning in earth, each of said plurality of earth contacting tubes comprising thermally conductive material to transfer heat with surrounding earth and with an adjacent earth contacting tube, a first earth contacting tube having an interior defining a vapor refrigerant passageway, a second earth contacting tube for providing additional heat transfer with the first earth contacting tube;

defining a liquid refrigerant passageway extending within the second earth contacting tube and being thermally insulated therefrom; and connecting the liquid refrigerant passageway and the vapor refrigerant passageway together in fluid communication.

45. A method according to claim 44 wherein the step of forming the plurality of earth contacting tubes comprises forming an elongate monolithic body to have a plurality of passageways extending lengthwise therethrough and defining the plurality of earth contacting tubes.

46. A method according to claim 44 wherein the step of forming the plurality of earth contacting tubes connected together comprises providing a plurality of discrete tubes and joining the tubes together in side-by-side relation.

47. A method according to claim 44 wherein the step of defining the liquid refrigerant passageway comprises positioning an insulating material within the second earth contacting tube.

* * * * *